(12) United States Patent
Laux et al.

(10) Patent No.: US 12,397,609 B2
(45) Date of Patent: Aug. 26, 2025

(54) AIR CONDITIONING SYSTEM OF A MOTOR VEHICLE

(71) Applicant: MAHLE International GmbH, Stuttgart (DE)

(72) Inventors: Holger Laux, Dietingen (DE); Walter Wolf, Oppenweiler-Zell (DE); Marc Fraas, Bietigheim-Bissingen (DE)

(73) Assignee: Mahle International GmbH, Stuttgart (DE)

( * ) Notice: Subject to any disclaimer, the term of this patent is extended or adjusted under 35 U.S.C. 154(b) by 379 days.

(21) Appl. No.: 17/940,684

(22) Filed: Sep. 8, 2022

(65) Prior Publication Data

US 2023/0076020 A1    Mar. 9, 2023

(30) Foreign Application Priority Data

Sep. 9, 2021 (DE) ...................... 10 2021 209 994.7

(51) Int. Cl.
*B60H 1/00* (2006.01)
(52) U.S. Cl.
CPC ..... *B60H 1/00328* (2013.01); *B60H 1/00564* (2013.01)
(58) Field of Classification Search
CPC ................. B60H 1/00328; B60H 1/00564
See application file for complete search history.

(56) References Cited

U.S. PATENT DOCUMENTS

| 6,206,092 B1 | 3/2001 | Beck et al. |
| 2002/0153132 A1 | 10/2002 | Nagano |
| 2003/0094261 A1 | 5/2003 | Abouchaar |
| 2006/0108094 A1 | 5/2006 | Abouchaar |
| 2019/0168567 A1 | 6/2019 | Schmitt et al. |

FOREIGN PATENT DOCUMENTS

| CN | 107614299 A | 1/2018 |
| CN | 112622570 A | 4/2021 |
| CN | 113002262 A | 6/2021 |

(Continued)

OTHER PUBLICATIONS

Beck, Automotive heating or air conditioning equipment, 1996, Full Document (Year: 1996).*

*Primary Examiner* — Nael N Babaa
(74) *Attorney, Agent, or Firm* — Muncy, Geissler, Olds & Lowe, P.C.

(57) ABSTRACT

An air conditioning system of a motor vehicle, having a housing with at least two independent air ducts formed therein, which are arranged separately from each other by at least one partition wall in the housing. A cooling heat exchanger is arranged in the housing such that it is flowed through by air, which can flow into the at least two independent air ducts. A heating heat exchanger is arranged in the housing such that it protrudes into the at least two independent air ducts and is flowed through by air of the at least two independent air ducts. The heating heat exchanger being an electrically operable heat exchanger, which is formed with several independently heated heat exchanger areas, so that the air flowing through an heat exchanger area is independently heatable and each independent air duct is provided at least one heat exchanger area.

12 Claims, 10 Drawing Sheets

(56) References Cited

FOREIGN PATENT DOCUMENTS

| | | | |
|---|---|---|---|
| DE | 19919132 A1 | 11/2000 | |
| DE | 10052136 A1 | 5/2002 | |
| DE | 10320750 A1 | 12/2004 | |
| DE | 102008006160 A1 | 7/2009 | |
| DE | 102016214116 A1 | 2/2018 | |
| FR | 2813823 A1 | 3/2002 | |
| FR | 3072613 A1 | 4/2019 | |
| JP | 4036922 B2 * | 1/2008 | ......... B60H 1/00064 |

* cited by examiner

AIR CONDITIONING SYSTEM OF A MOTOR VEHICLE

This nonprovisional application claims priority under 35 U.S.C. § 119(a) to German Patent Application No. 10 2021 209 994.7, which was filed in Germany on Sep. 9, 2021, and which is herein incorporated by reference.

BACKGROUND OF THE INVENTION

Field of the Invention

The present invention relates to an air conditioning system of a motor vehicle.

Description of the Background Art

Air conditioning systems of motor vehicles comprise a housing with at least one air duct and with dampers and heat exchangers arranged therein. Known are single-zone air conditioning systems and multi-zone air conditioning systems.

A single-zone air conditioning system produces a substantially homogeneous air flow with a substantially uniform temperature in the air duct in the housing of the air conditioning system. This homogeneous air flow is temperature-controlled by means of a flow through an evaporator and/or a radiator and it is divided into air outlets in the motor vehicle, from which the air flows out with a substantially identical temperature. Only one temperature can be preselected by the passengers, wherein the flow through the evaporator and/or the radiator is controlled by air dampers in order to control the air temperature or room temperature according to the temperature specification. The hot air dampers and cold air dampers provided for temperature adjustment are set in accordance with this one, adjustable temperature specification.

A multi-zone air conditioning system has several independently arranged air ducts in the housing, wherein the number of air ducts depends on the number of zones in the interior of the motor vehicle that are to be supplied. A two-zone air conditioning system has two independent air ducts, in each of which an independent air flow flows and is temperature-controlled. The independent air ducts are created in the housing by the arrangement of partition walls. The respective air flow is temperature-controlled by flowing through a part of the evaporator and/or a part of the radiator and it is distributed to air outlets in the motor vehicle in the respective zone, from which the air flows with a substantially identical temperature into the respective zone of the interior. One temperature per zone can be preselected by the passengers, wherein the flow through the respective part of the evaporator and/or the respective part of the radiator is controlled by means of the respective cold air dampers and hot air dampers in the respective air ducts in order to control the air temperature or room temperature according to the temperature specification. The air dampers provided for temperature adjustment are set in accordance with the respective adjustable temperature specification. In a two-zone system, a hot air damper and a cold air damper are provided for each of the two air ducts. Due to the air conditioning system having several zones, the number of required cold and hot air dampers and also the number of actuators required for the dampers increases as compared to a single-zone air conditioning system. A two-zone air conditioning system therefore requires twice as many dampers and actuators as a single-zone air conditioning system. A three-zone air conditioning system tempers three independent air flows in three air ducts and therefore requires three times as many dampers and actuators as a single-zone air conditioning system. A four-zone air conditioning system tempers four independent air flows in four air ducts and therefore requires four times as many dampers and actuators as a single-zone air conditioning system.

The production of a multi-zone air conditioning system therefore requires a significantly higher number of components than a single-zone air conditioning system, in particular a higher number of dampers and actuators, which significantly increases the cost. This also increases the complexity and installation effort.

SUMMARY OF THE INVENTION

It is therefore an object of the present invention to provide a multi-zone air conditioning system, which allows for several air flows to be tempered independently, wherein cost and installation effort are reduced as compared to the prior art.

An exemplary embodiment of the invention relates to an air conditioning system of a motor vehicle, comprising a housing having at least two independent air ducts formed therein, which are arranged separately from each other in the housing by means of at least one partition wall, wherein a cooling heat exchanger is arranged in the housing in such a way that it can be flowed through by air, which can flow into the at least two independent air ducts, wherein a heating heat exchanger is provided, which is arranged in the housing in such a way that it protrudes into the at least two independent air ducts and is flowed through by the air of at least two independent air ducts, wherein the heating heat exchanger is an electrically operable heat exchanger, which is formed with several independently heated heat exchanger areas, so that the air flowing through a heat exchanger area is independently heatable, wherein at least one heat exchanger area is provided for each independent air duct, which area is arranged in the respective independent air duct. As a result, the air in each independent air duct can be heated independently of each other, so that the temperature of the air in each independent air duct can be individually controlled. This creates a simplified air conditioning system that can do without a radiator with cooling fluid flow for air heating, which simplifies the design. Also, a respective hot air damper in the air ducts can be dispensed with, which also simplifies the design, because the heat output of the electrically operable and controllable heat exchanger can be varied very quickly, so that instead of the hot air dampers it is sufficient if the heating heat exchanger is specifically controlled in the respective heat exchanger areas with regard to its heat output. Overall, this results in a simplified and thus also cost-effective air conditioning system for at least two zones of a motor vehicle, in which the air flowing into the zones can be independently tempered and controlled.

The air conditioning system according to the invention is advantageously characterized in that only the one heating heat exchanger is provided as an electrically operable heat exchanger for heating purposes of the air, in order to heat the air in the housing of the air conditioning system, so that, in particular, heating heat exchangers flowed through by fluid or coolant for heating purposes can be dispensed with. The provided heating heat exchanger is preferably a heat exchanger, which is an electrically operable heat exchanger, which is formed with several independently heated heat exchanger areas. As a result, the respective heatable heat exchanger areas can be controlled independently of each other with regard to their heat output, so that each heat exchanger area can heat the air flowing through it in an independent and individually controllable manner.

The heating heat exchanger can engage with the respective independent air ducts in such a way that in each case a cold air duct is provided in the respective air duct, which guides air past the heating heat exchanger. The heating heat exchanger, generally also referred to as a radiator, thus protrudes only partially into the respective independent air channels, so that air can flow through the heat exchanger and/or can flow past the heat exchanger. The proportion of the air flow that flows past the heating heat exchanger in the respective air duct is not heated. The proportion of the air flow that flows in the respective air duct through the heating heat exchanger can be heated depending on the selected heat output, or not, for example, if no heat output is selected.

The respective cold air duct can be assigned a cold air damper, by means of which the respective cold air duct can be opened or closed. The respective cold air duct through the corresponding cold air damper can also be adjusted between the fully opened setting and the completely closed setting, so that the air volume through the cold air duct can also be controlled via the setting of the cold air damper. The respective cold air damper can thus be set between a completely open and a completely closed position in order to adjust the air flow through the assigned cold air duct. Optionally, each cold air damper is independently adjustable, for which an actuator, such as an electric motor, is advantageously provided.

At least one air outlet can be assigned to each air duct downstream of the heating heat exchanger. For example, each air duct may be assigned a single air outlet, or a higher number of air outlets, for example two, three, four or more air outlets, may be assigned to one air duct or several air ducts.

Such air outlets can be a defrost outlet, front ventilation, rear ventilation, front footwell, rear footwell, etc.

For example, an air duct may be assigned a defrost outlet, an air outlet for front ventilation and an air outlet front footwell. Another air duct may be assigned, for example, an air outlet for rear ventilation and an air outlet rear footwell. Another air duct may be assigned, for example, a defrost outlet, an air outlet for front and rear ventilation and an air outlet front and rear footwell.

Further, the air conditioning system can be a two-zone air conditioning system, comprising at least two air ducts, wherein each of the two air ducts with its at least one air outlet is assigned to a zone in the interior of the motor vehicle. For example, in the case of the two-zone air conditioning system, one zone can be defined as the vehicle interior on the driver's side and the second zone as a zone on the passenger side.

The air conditioning system can be a three-zone air conditioning system, comprising at least three air ducts, wherein each of the three air ducts with its at least one air outlet is assigned to a zone in the interior of the motor vehicle. For example, in the case of the three-zone air conditioning system, a first zone can be defined as the front of the vehicle interior on the driver's side and a second zone as a zone as the front of the vehicle interior on the passenger side. A third zone can be the rear area of the vehicle interior.

The air conditioning system can be a four-zone air conditioning system, comprising at least four air ducts, wherein each of the four air ducts with its at least one air outlet is assigned to a zone in the interior of the motor vehicle. For example, in the case of the four-zone air conditioning system, a first zone can be defined as the front of the vehicle interior on the driver's side and a second zone as a zone as the front of the vehicle interior on the passenger side. A third zone can be the rear area of the vehicle interior on the driver's side and a fourth zone can be the rear area of the vehicle interior on the passenger side.

It is also expedient if two air ducts are assigned to zones of the motor vehicle interior, which are arranged in the front area of the vehicle interior and that an air duct of the three-zone air conditioning system or two air ducts of the four-zone air conditioning system are assigned to zones of the vehicle interior, which are arranged in the rear area of the vehicle interior. As a result, the air flows can be suitably separated.

The cross-section of the air ducts for the front area can be equal to or greater than the cross-section of the air duct or the air ducts for the rear area.

At least one partition wall downstream of the heating heat exchanger can have at least one opening, wherein the respective opening is assigned a damper by means of which the opening can be opened or closed. As a result, in certain operating situations, non-dependent air ducts can be coupled by opening the opening by means of the damper. If the opening is closed again by means of the damper, the air ducts are separated again. This way, a separation between air ducts of the front and an air duct or several air ducts of the rear can be connected or separated.

At least one further bypass duct can be provided, in particular, a further bypass duct is provided in each air duct, which in each case leads past the cooling heat exchanger, wherein in the respective further bypass duct optionally a bypass valve is provided for controlling the flow of at least one further bypass duct. As a result, the flow resistance can be reduced in specific operating modes.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
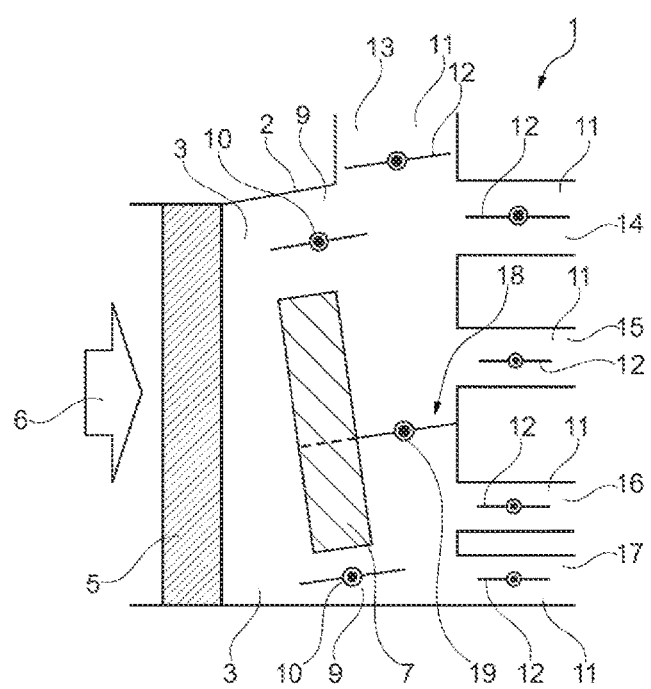
FIG. 1 is a schematic sectional view of a first embodiment of an air conditioning system according to the invention as a four-zone air conditioning system.

In a schematic sectional view, FIG. 1 shows an air conditioning system 1 according to the invention for a motor vehicle.

The air conditioning system 1 comprises a housing 2, which has air ducts 3 formed therein. The air ducts 3 are separately formed and divided in the housing 2 by partition walls 4, see also FIG. 2, so that they can be flowed through by air independently of each other.

In this case, the housing 2 may be formed with at least two independent air ducts 3, but it may also be provided with more or fewer independent air ducts 3. Thus, in one example, only one independent air duct 3 may be provided and in other embodiments three or four independent air ducts 3 may be provided. In this case, the respective partition wall 4 or the respective partition walls 4 in the housing 2 can be modularly designed and can be inserted accordingly in the housing 2 during assembly of the housing 2 to achieve the respective, desired number of zones of the air conditioning system 1.

The air ducts 3 of a two-zone air conditioning system 1 can also be operated in such a way that said ducts are used and controlled in an equal manner, so that effectively a single-zone air conditioning system 1 results. Generally, this can also be done for other air conditioning systems, resulting in a low-zone air conditioning system by using and controlling the higher-zone air conditioning system in an equal manner.

The air conditioning system provides a cooling heat exchanger 5, such as an evaporator, which is arranged in the housing 2 in such a way that it can be flowed through by air 6, which can flow into the at least two independent air ducts 3. In this case, the cooling heat exchanger 5 may be provided upstream of the independent air duct 3 and occupy the entire cross-section of the housing 2 in this area, so that the air flowing through the cooling heat exchanger 5 is divided 6 among the independent air ducts 3.

Alternatively, the division of the independent air ducts 3 could also be done upstream of the cooling heat exchanger 5, so that the cooling heat exchanger 5 already intervenes in the independent air ducts 3.

Furthermore, a heating heat exchanger 7, also called a radiator, is provided, which is arranged in the housing 2 in such a way that it protrudes into the at least two independent air ducts 3 and is flowed through by air 6 of the at least two independent air ducts 3.

Figure 2:
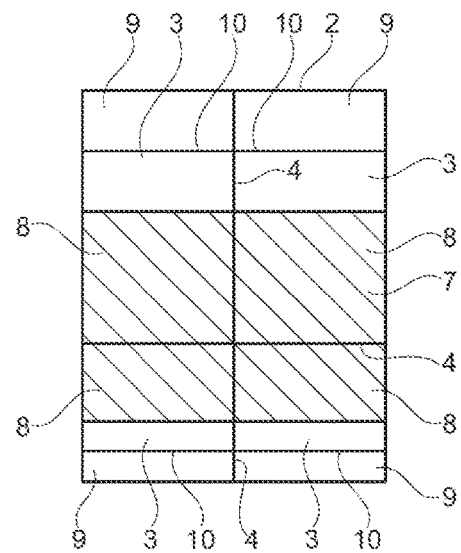
FIG. 2 is a frontal view of the heating heat exchanger, such as the radiator.

In the exemplary embodiment of FIGS. 1 and 2, a four-zone air conditioning system 1 is shown, which has four independent air ducts 3. The heating heat exchanger 7 intervenes accordingly in the four independent air ducts 3, as can be seen in FIG. 2.

According to the design of the invention, the heating heat exchanger 7 is an electrically operable heat exchanger 7, which is heatable by feeding electrical energy in order to heat flowing air 6.

The heating heat exchanger 7 is designed in such a way that it is formed with several independently heated heat exchanger areas 8. This ensures that the air 6 flowing through a heat exchanger area 8 is independently heated. Thus, air 6 which flows through a heat exchanger area 8 can be heated more strongly or weaker, or not at all, than air 6 which flows through another heat exchanger area 8. Advantageously, the heat output in the respective heat exchanger area 8 can be individually regulated or controlled.

According to the embodiment, at least one heat exchanger area 8 is provided for each independent air duct 3, which is arranged in the respective independent air duct 3.

The heating heat exchanger 7 is designed and arranged in such a way that only the one heating heat exchanger 7 is provided, which is an electrically operable heat exchanger 7, which is formed with several independently heated heat exchanger areas 8. A fluid-traversed heat exchanger as a radiator is not provided.

Furthermore, it is provided that the heating heat exchanger 7 in the housing 2 is arranged in such a way that it intervenes in the respective independent air ducts 3 in such a way that in each case a cold air duct 9 is provided in the respective air duct 3, which guides air past the heating heat exchanger 7.

To control the air flow through the cold air duct 9, a cold air damper 10 is provided for each cold air duct 9. By means of the respective cold air damper 10 assigned to the cold air duct 9, the flow of air through the cold air duct 9 can be controlled or regulated. The respective cold air damper 10 can be operated by means of an actuator, so that the cold air damper 10 can open or close the respective cold air duct 9 or the cold air damper 10 is adjustable in an intermediate position, so that the cold air duct 9 is partially opened or closed. The cold air duct 9 can be opened or closed via the cold air damper 10 or can be adjusted in an intermediate position. As a result, the proportion of air that flows through the heating heat exchanger 7 can be adjusted to the proportion of air that flows past the heating heat exchanger 7. In this case, the air flowing past the heat exchanger 7 mixes after the heat exchanger 7 with the air flowing through the heat exchanger 7, so that downstream of the heating heat exchanger 7 a mixture of the air takes place.

If, for example, a heat exchanger area 8 of the heat exchanger 7 is not heated, then cold air flows through the heat exchanger 7 in the heat exchanger area 8 through the heating heat exchanger 7 and mixes downstream of the heat exchanger 7 with cold air, which flows past the heat exchanger 7. The result is cold air.

If, for example, a heat exchanger area 8 of the heat exchanger 7 is heated only weakly, then air flows through the heat exchanger 7 in the heat exchanger area 8, which is heated by the heating heat exchanger 7 and which mixes downstream of the heat exchanger 7 with cold air, which flows past the heat exchanger 7. The result is weakly heated air.

If, for example, a heat exchanger area 8 of the heat exchanger 7 is heated strongly up to a maximum, then air flows through the heat exchanger 7 in the heat exchanger area 8, which is strongly heated by the heating heat exchanger 7 and which mixes downstream of the heat exchanger 7 with cold air, which flows past the heat exchanger 7 in a reduced or dosed manner. The result is moderately heated air.

If, for example, a heat exchanger area 8 of the heat exchanger 7 is heated to a maximum, then air flows through the heat exchanger 7 in the heat exchanger area 8, which is heated to a maximum by the heating heat exchanger 7, wherein no air flows past the heat exchanger 7 because the cold air damper 10 is closed. The result is strongly heated air.

The heat output of the heat exchanger area 8 of the heating heat exchanger 7 and the cold air damper 10 can be adjusted individually for each air duct 3, so that the air 6 can be individually temperature-controlled in each air duct 3.

FIG. 1 shows that each air duct 3 downstream of the heating heat exchanger 7 is assigned at least one air outlet 11. Each air outlet 11 can also be assigned an outlet damper 12 controlling the air outlet 11. For example, each air duct 3 may be assigned a single air outlet 11 or one or each air duct 3 or several air ducts 3 may also be assigned to a higher number of air outlets 11, for example two, three, four or more air outlets 11. Such air outlets 11 can be, for example, a defrost outlet 13, front ventilation 14, rear footwell 16, front footwell 15, rear ventilation 17, etc.

An air duct 3 may be assigned, for example, a defrost outlet 13, an air outlet 11 for front ventilation 14 and an air outlet 15 front footwell. Another air duct 3 may be assigned, for example, an air outlet 17 for rear ventilation and an air outlet 16 rear footwell. Another air duct 11 may be assigned, for example, a defrost outlet 13, an air outlet 11 for front ventilation 14 and rear ventilation 17 and an air outlet 11 front footwell 15 and rear footwell 16.

The air conditioning system 1 shown in FIGS. 1 and 2 is a four-zone air conditioning system 1 comprising at least four air ducts 3, wherein each of the four air ducts 3 with its at least one air outlet 11 is assigned to a zone in the interior of the motor vehicle. For example, in the case of the four-zone air conditioning system 1, a first zone can be defined as the front of the vehicle interior on the driver's side and a second zone as a zone as the front of the vehicle interior on the passenger side. A third zone can be the rear area of the vehicle interior on the driver's side and a fourth zone can be the rear area of the vehicle interior on the passenger side. Thus, each air duct 3 can be assigned to one of these zones in order to be able to set at least the temperature in the respective zone individually.

Figure 16:
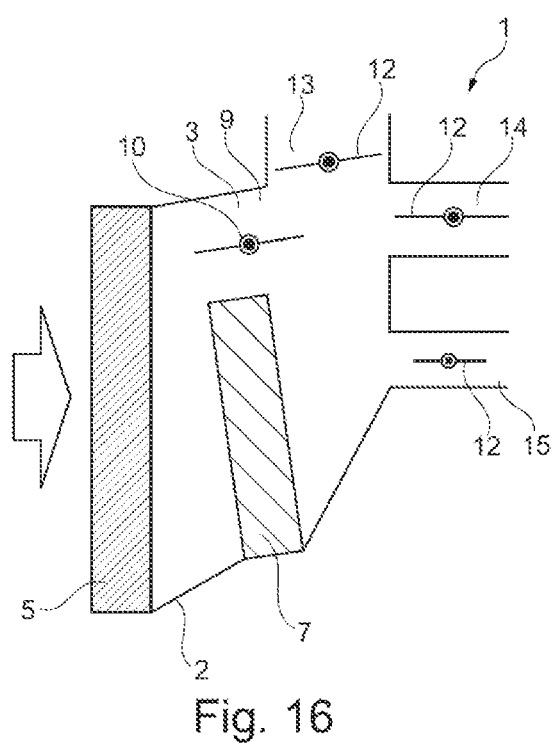
FIG. 16 is a schematic sectional view of a third embodiment of an air conditioning system according to the invention as a two-zone air conditioning system.
Figure 17:
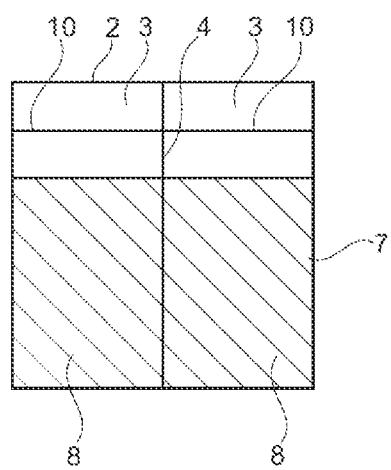
FIG. 17 is a frontal view of the heating heat exchanger, such as the radiator, according to FIG. 16.

In another exemplary embodiment according to FIGS. 16 and 17, it is expedient if the air conditioning system 1 is a two-zone air conditioning system 1, comprising at least two air ducts 3, wherein each of the two air ducts 3 with its at least one air outlet 11 is assigned to a zone in the interior of the motor vehicle. For example, in the case of the two-zone air conditioning system 1, one zone can be defined as the vehicle interior on the driver's side and the second zone as a zone on the passenger side.

Figure 14:
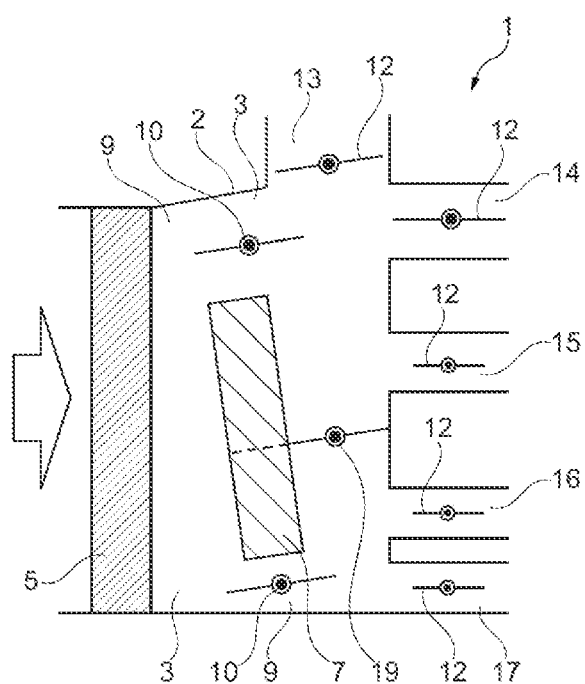
FIG. 14 is a schematic sectional view of a second embodiment of an air conditioning system according to the invention as a three-zone air conditioning system.
Figure 15:
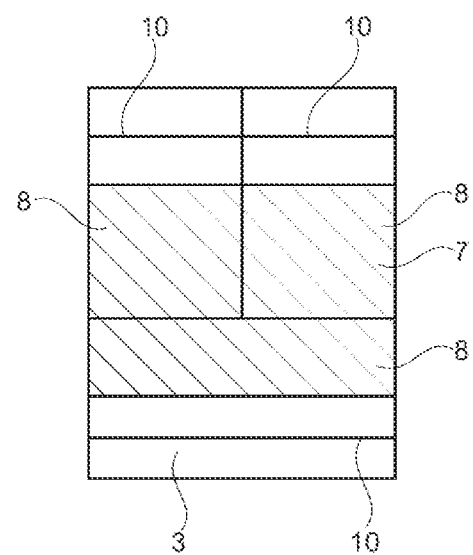
FIG. 15 is a frontal view of the heating heat exchanger, such as the radiator, according to FIG. 14.

In another exemplary embodiment according to FIGS. 14 and 15, it may also be expedient if the air conditioning system 1 is a three-zone air conditioning system 1, comprising at least three air ducts 3, wherein each of the three air ducts 3 with its at least one air outlet 11 is assigned to a zone in the vehicle interior. For example, in the case of the three-zone air conditioning system 1, a first zone may be defined as the front of the vehicle interior on the driver's side and a second zone as a zone as the front of the vehicle interior on the passenger side. A third zone can be the rear area of the vehicle interior.

FIG. 1 further shows that at least one partition wall 4 downstream of the heating heat exchanger 7 has at least one opening 18, wherein the respective opening 18 is assigned a damper 19, by means of which the opening 18 can be opened or closed.

This way, downstream of the heating heat exchanger 7, air ducts 3 can be connected to each other or the air ducts 3 can be kept separated.

For example, in a defrost mode, the air 6, which is intended in another operating mode for the rear area, can be directed into the defrost outlet 13 when the damper 19 is opened and the dampers 12 of the air outlets 16 and 17 are closed and, optionally, also the dampers 12 of the air outlets 14 and 15. In normal operation, the damper 19 is closed and preserves the separation of the air ducts 3.

Figure 3:
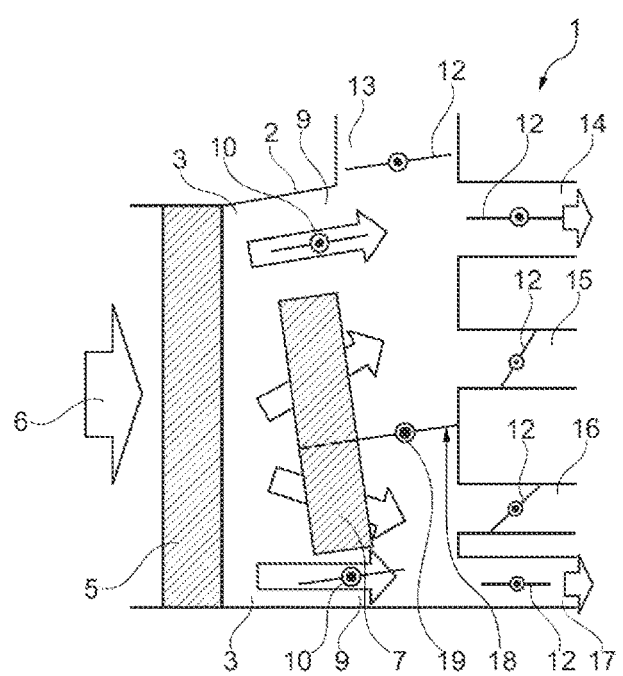
FIG. 3 is a schematic sectional view of the first embodiment of an air conditioning system according to the invention as a four-zone air conditioning system in a first operating mode.
Figure 4:
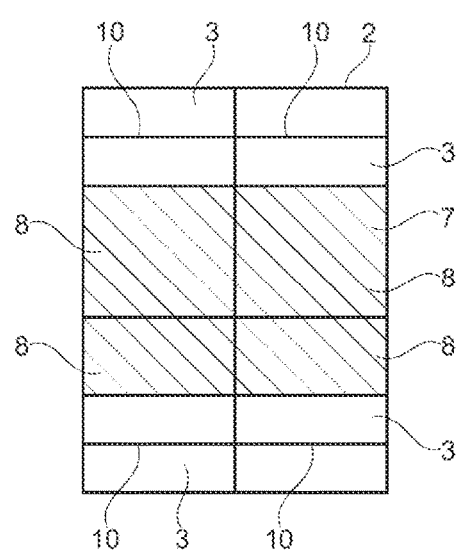
FIG. 4 is a frontal view of the heating heat exchanger, such as the radiator, in the first operating mode.

FIGS. 3 and 4 show the air conditioning system 1 of the embodiment of FIGS. 1 and 2 in a cold air operating mode, in which the heating heat exchanger 7 is not heated. Accordingly, cold air flows from the cooling heat exchanger 5, with dampers 10 open, through the cold air ducts 9 in the respective air ducts 3. Cold air also flows through the non-heated heating heat exchanger 7. The dampers 12, for example, of the air outlets 13, 15 and 16 are closed and, for example, only the dampers 12 of the air outlets 14 and 17 are open. Accordingly, cold air flows through the air outlets front ventilation 14 and through the air outlets rear ventilation 17.

Figure 5:
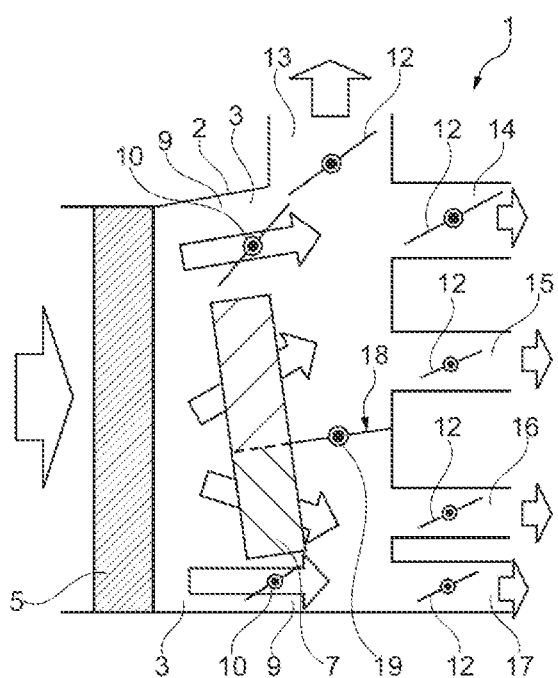
FIG. 5 is a schematic sectional view of the first embodiment of an air conditioning system according to the invention as a four-zone air conditioning system in a second operating mode.
Figure 6:
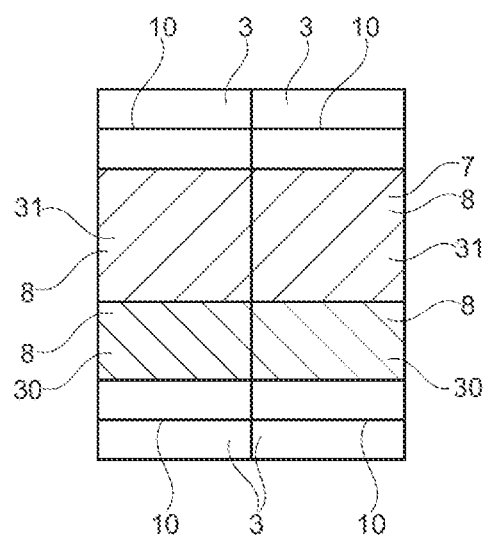
FIG. 6 is a frontal view of the heating heat exchanger, such as the radiator, in the second mode of operation.

FIGS. 5 and 6 show the air conditioning system 1 of the embodiment of FIGS. 1 and 2 in a mixed operation with hotter air for the rear area, in which the heating heat exchanger 7 in its heat exchanger areas 30 for the rear is heated more strongly than the heat exchanger areas 31 for the front. Accordingly, cold air flows from the cooling heat exchanger 5, with dampers 10 open, through the cold air ducts 9 into the respective air ducts 3. Cold air also flows through the heated heating heat exchanger 7 and is heated there accordingly and mixes with the cold air from the cold air duct 9 after the heating heat exchanger 7. The dampers 12 are all slightly open, so that heated air flows out of all the air outlets 12 to 17.

Figure 7:
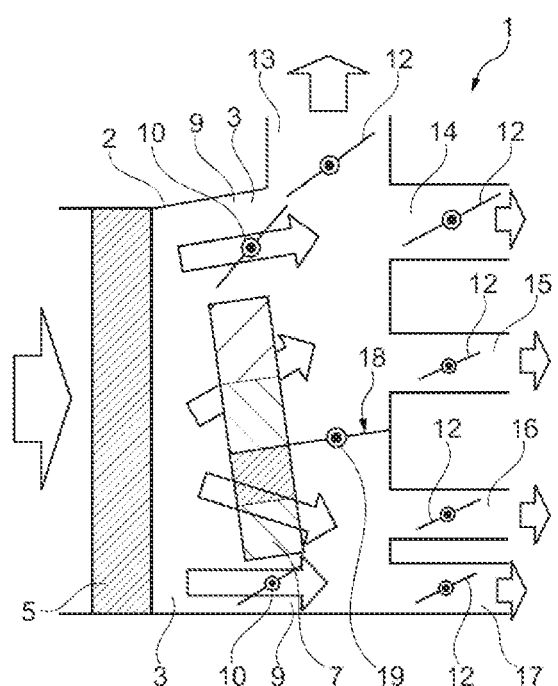
FIG. 7 is a schematic sectional view of the first embodiment of an air conditioning system according to the invention as a four-zone air conditioning system in a third operating mode.
Figure 8:
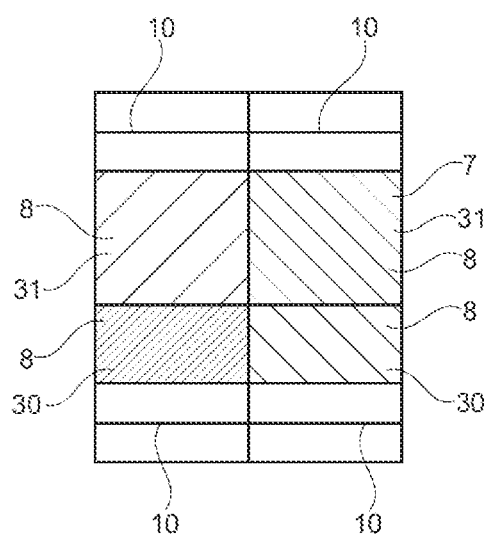
FIG. 8 is a frontal view of the heating heat exchanger, such as the radiator, in the third operating mode.

FIGS. 7 and 8 show the air conditioning system 1 of the embodiment of FIGS. 1 and 2 in another mixed operation with differently heated air for the different zones. In the zone for the front driver's side the air is moderately heated, in the zone for the front passenger side the air is strongly heated, in the zone for the rear driver's side the air is unheated and in the zone for the rear passenger side the air is moderately heated. Cold air from the cooling heat exchanger 5 also flows through the cold air ducts 9 in the respective air ducts 3 with at least slightly open dampers 10. Cold air also flows through the heated heating heat exchanger 7 and is heated there according to the control and mixes with the cold air from the cold air duct 9 after the heating heat exchanger 7. The dampers 12 are all at least slightly open, so that heated air flows out of all the air outlets 12 to 17.

Figure 9:
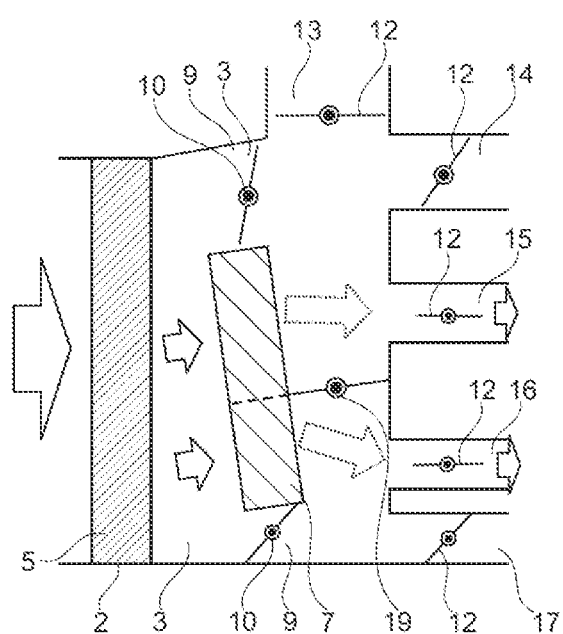
FIG. 9 is a schematic sectional view of the first embodiment of an air conditioning system according to the invention as a four-zone air conditioning system in a fourth operating mode.
Figure 10:
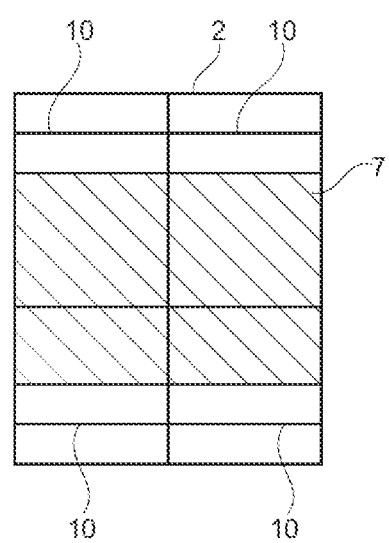
FIG. 10 is a frontal view of the heating heat exchanger, such as the radiator, in the fourth operating mode.

FIGS. 9 and 10 show the air conditioning system 1 of the embodiment of FIGS. 1 and 2 in a hot air operating mode, in which the heating heat exchanger 7 is strongly heated. The cold air dampers 10 are closed so that no cold air flows from the cooling heat exchanger 5 through the cold air ducts 9 into the respective air ducts 3. Air also flows through the strongly heated heat exchanger 7 and is heated there. The dampers 12, for example, of the air outlets 13, 14 and 17 are closed and, for example, only the dampers 12 of the air outlets 15 and 16 are open. Accordingly, very hot air flows through the air outlets front footwell 15 and through the air outlets rear footwell 16.

Figure 11:
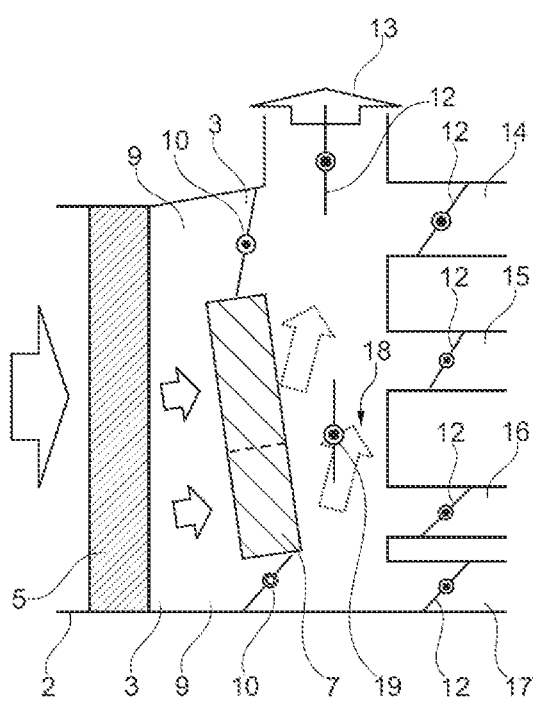
FIG. 11 is a schematic sectional view of the first embodiment of an air conditioning system according to the invention as a four-zone air conditioning system in a fifth operating mode.
Figure 12:
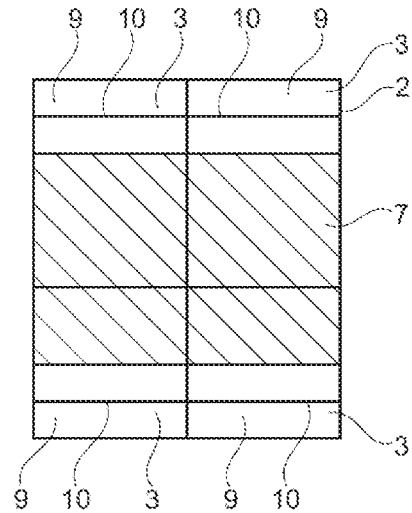
FIG. 12 is a frontal view of the heating heat exchanger, such as the radiator, in the fifth operating mode.

FIGS. 11 and 12 show the air conditioning system 1 of the embodiment of FIGS. 1 and 2 in a defrost operating mode, in which the heating heat exchanger 7 is strongly heated and the hot air is discharged only from the defrost outlet 13. The cold air dampers 10 are closed so that no cold air flows from the cooling heat exchanger 5 through the cold air ducts 9 into the respective air ducts 3. Air also flows through the strongly heated heating heat exchanger 7 and is heated there. The damper 19 is open and releases the opening 18, so that hot air can be discharged from the air ducts 3 for the rear to the defrost outlet 13. The dampers 12, for example, of the air outlets 14 to 17 are closed and only the damper 12 of the air outlet 13 is open. Accordingly, very hot air flows only through the air outlet defrost 13.

Figure 13:
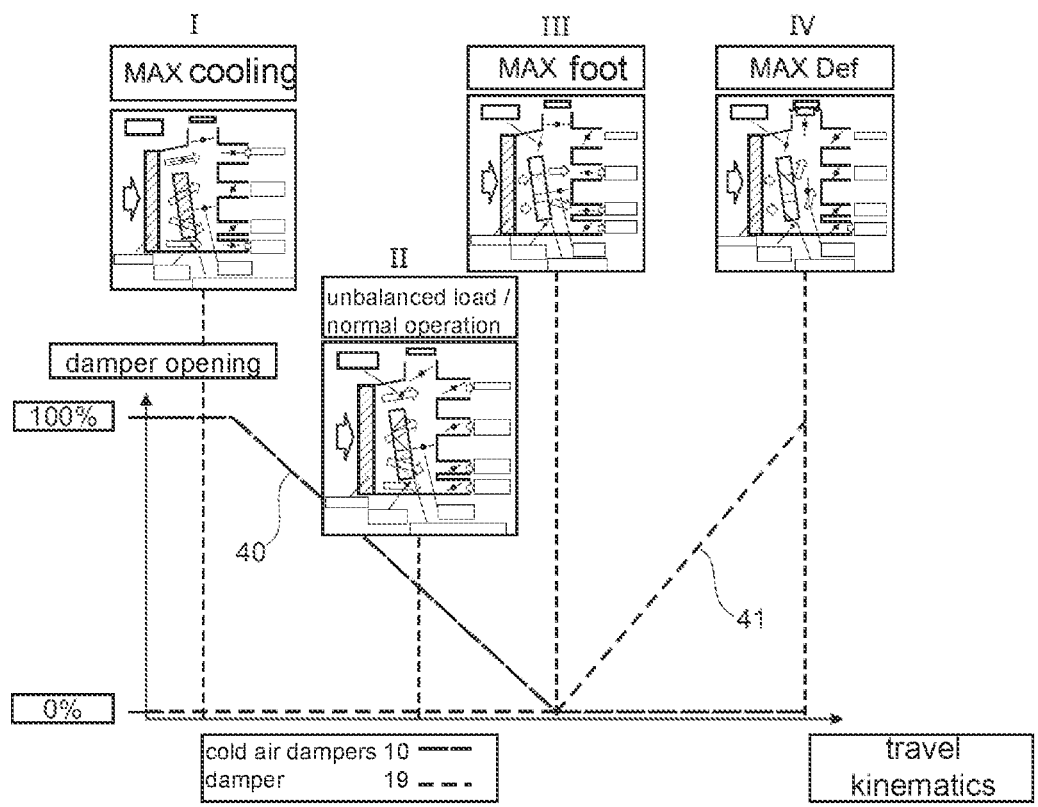
FIG. 13 is a diagram explaining the functionality of coupling dampers.

The dampers 10 and 19 can be controlled independently of each other by actuators. Alternatively, a coupling of dampers 10 and 19 can also be carried out. FIG. 13 shows such a coupling on the basis of a diagram showing the damper opening of the dampers 10 and 19 as a function of the travel kinematics of an actuator.

A curve 40 is shown, which shows the damper position of the dampers 10 and a curve 41, which shows the damper position of the dampers 19. Viewed from left to right, it can be seen that there is a cold air operating mode I on the far left. The cold air dampers 10 are maximally open and the dampers 19 are closed.

Viewed further to the right, there is a correspondingly mixed operating mode II, in which the cold air dampers 10 are partially closed and the dampers 19 are closed.

Still further to the right is a corresponding maximum heating mode III, for example a Max-Fuß operating mode, in which the cold air dampers 10 are closed and the dampers 19 are closed.

On the far right is the defrost mode IV, in which the cold air dampers 10 are closed and the dampers 19 are opened.

FIGS. 14 and 15 show a further embodiment of an air conditioning system 1 according to the invention, in which a three-zone air conditioning system 1 is shown. The air conditioning system 1 of FIGS. 14 and 15 substantially corresponds to the air conditioning system 1 of FIGS. 1 and 2, wherein a partition wall is not provided for the rear area and only one air duct 3 is provided for the rear area, which feeds the air outlets 16 and 17. As a result, the cold air damper 10 is designed continuously or two coupled cold air dampers 10 are provided.

The heating heat exchanger 7 may be the same heat exchanger as in the embodiment of FIGS. 1 and 2, wherein the heat exchanger area 8 for the rear can be coupled by the controller. Alternatively, the heating heat exchanger 7 may also have only three heat exchanger areas 8 for the respective air ducts 3.

FIGS. 16 and 17 show a further embodiment of an inventive air conditioning system 1, in which a two-zone air conditioning system 1 is shown. The air conditioning system 1 of FIGS. 16 and 17 substantially corresponds to the air conditioning system 1 of FIGS. 1 and 2, wherein the air ducts 3 for the rear and the air outlets 16, 17 for the rear are omitted. The partition wall 4 for the division between the driver's side and the passenger side for the front or together for the front and rear is still provided.

The heating heat exchanger 7 may be the same heat exchanger as in the embodiment of FIGS. 1 and 2, wherein the heat exchanger areas 8 for the rear can be coupled with the heat exchanger areas for the front by means of the controller. Alternatively, the heating heat exchanger 7 can also have only two heat exchanger areas 8 for the respective air ducts 3.

Figure 18:
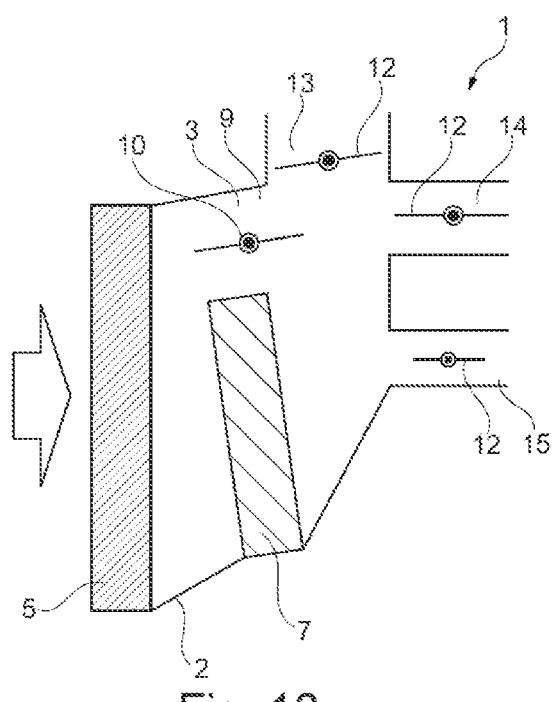
FIG. 18 is a schematic sectional view of a first embodiment of an air conditioning system according to the invention as a single-zone air conditioning system.
Figure 19:
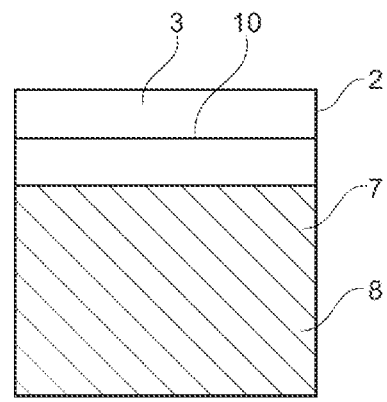
FIG. 19 is a frontal view of the heating heat exchanger, such as the radiator, according to FIG. 18.

FIGS. 18 and 19 show a further embodiment of an inventive air conditioning system 1, in which a single-zone air conditioning system 1 is shown. The single-zone air conditioning system 1 of FIGS. 18 and 19 substantially corresponds to the air conditioning system 1 of FIGS. 16 and 17, wherein the separation of the air ducts 3 for the driver's side and the passenger side is eliminated. The partition wall 4 for the division between the driver's side and the passenger side for the front or together for the front and rear may be omitted or may alternatively be provided, wherein then, by controlling the heating heat exchanger 7, a coupling of the air ducts 3 can be carried out.

The heating heat exchanger 7 may be the same heat exchanger 7 as in the embodiment of FIGS. 1 and 2 or FIGS. 16 and 17, wherein the heat exchanger areas 8 for the driver's side and for the rear with the heat exchanger areas for the front and for the passenger side may be coupled by the controller. Alternatively, the heating heat exchanger 7 may also have only one heat exchanger area 8 for the air duct 3.

Optionally, a single-zone air conditioning system 1 of a motor vehicle can also be designed, comprising a housing 2 with at least one air duct formed therein, wherein two air ducts operated in parallel may also be provided, which can be arranged separately from each other by means of at least one partition wall 4 in the housing 2, wherein a cooling heat exchanger 5 may be arranged in the housing 2 in such a way that it is flowed through by air 6, which flows into the at least one air duct 3, wherein a heating heat exchanger 7 is provided, which is arranged in the housing 2 in such a way that it protrudes into the at least two independent air ducts 3 and is flowed through by air 6 of the air duct 3, wherein the heating heat exchanger 7 is an electrically operable heat exchanger, which is formed with a heated heat exchanger area or with several independently heated heat exchanger areas 8, wherein the several heat exchanger areas can be operated jointly by the controller, so that air 6 flowing through the one heat exchanger area 8 or the heat exchanger areas 8 operated in parallel is heatable.

Alternatively, or additionally, it may be provided in another embodiment that another air duct leads past the cooling heat exchanger 5 as a bypass duct. Wherein such a bypass duct may be provided with a corresponding bypass valve in order to be able to control the flow through this bypass duct. As a result, the flow resistance can also be reduced again for the operating modes III or VI to II "heating" to "moderate cooling" by the cooling heat exchanger 5, such as an evaporator, being surrounded by air. In the operating mode I of the maximum cooling, this bypass duct is then closed again.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. Air conditioning system of a motor vehicle, the air conditioning system comprising:
   a housing;
   at least two independent air ducts arranged in the housing, the at least two independent air ducts being arranged separately from each other by at least one partition wall in the housing;
   a cooling heat exchanger arranged in the housing such that the cooling heat exchanger is flowed through by air, which is adapted to flow into the at least two independent air ducts; and
   a heating heat exchanger arranged in the housing such that the heating heat exchanger protrudes into the at least two independent air ducts and is flowed through by air of the at least two independent air ducts,
   wherein the heating heat exchanger is an electrically operable heat exchanger, which is formed with several independently heated heat exchanger areas so that the air flowing through each of the heat exchanger areas is independently heatable,
   wherein each respective independent air duct of the at least two independent air ducts is provided with at least one of the heat exchanger areas, the at least one of the heat exchanger areas of each respective independent air duct being arranged in the respective independent air duct, and
   wherein at least one partition wall downstream of the heating heat exchanger has at least one opening, and wherein the at least one opening is assigned a damper via which the at least one opening is adapted to be opened or closed.

2. The air conditioning system according to claim 1, wherein only one of the heating heat exchanger is provided, which is an electrically operable heat exchanger, and which is formed with the several independently heated heat exchanger areas.

3. The air conditioning system according to claim 1, wherein the heating heat exchanger intervenes in each respective independent air duct and wherein each respective independent air duct further has a cold air duct provided therein, which leads air past the heating heat exchanger.

4. The air conditioning system according to claim 3, wherein the cold air duct of each respective independent air duct is assigned a cold air damper via which the cold air duct is adapted to be opened or closed.

5. The air conditioning system according to claim 1, wherein each respective independent air duct is assigned at least one air outlet downstream of the heating heat exchanger.

6. The air conditioning system according to claim 1, wherein the air conditioning system is a two-zone air conditioning system comprising two of the respective independent air ducts, and wherein each of the two respective independent air ducts has at least one air outlet assigned to a zone in the vehicle interior.

7. The air conditioning system according to claim 1, wherein the air conditioning system is a three-zone air conditioning system comprising three of the respective independent air ducts, and wherein each of the three respective independent air ducts has at least one air outlet assigned to a zone in the interior of the motor vehicle.

8. The air conditioning system according to claim 1, wherein the air conditioning system is a four-zone air conditioning system comprising four of the respective independent air ducts, and wherein each of the four respective independent air ducts has at least one air outlet assigned to a zone in the interior of the motor vehicle.

9. The air conditioning system according to claim 7, wherein two of the three respective independent air ducts are assigned to zones of the motor vehicle interior which are arranged in a front area of the vehicle interior, and that a third one of the three respective independent air ducts is assigned to a zone of the interior of the motor vehicle which is arranged in a rear area of the vehicle interior.

10. The air conditioning system according to claim 1, wherein a bypass duct is provided in each respective independent air duct, wherein the bypass duct leads past the cooling heat exchanger, and wherein a bypass damper is provided in the bypass duct to control the flow through the bypass duct.

11. The air conditioning system according to claim 8, wherein two of the four respective independent air ducts are assigned to zones of the motor vehicle interior which are arranged in a front area of the vehicle interior, and the other two of the four respective independent air ducts are assigned to zones of the interior of the motor vehicle which are arranged in a rear area of the vehicle interior.

12. The air conditioning system according to claim 1, wherein when the damper assigned to the at least one opening is fully closed, air flow in each of the respective independent air ducts remains separate from each other downstream from the heating heat exchanger, and wherein when the damper assigned to the at least one opening is open, the air flow in each of the respective independent air ducts is connected to each other downstream from the heating heat exchanger.

* * * * *